United States Patent [19]

Braathen

[11] 4,150,787
[45] Apr. 24, 1979

[54] METHOD AND ARRANGEMENT FOR SAVING ENERGY IN PREPARING HOT WATER FOR HOUSEHOLD

[76] Inventor: Chris R. Braathen, 4645 Belvedere Dr., P.O. Box 686, Julian, Calif. 92036

[21] Appl. No.: 893,417

[22] Filed: Apr. 4, 1978

Related U.S. Application Data

[62] Division of Ser. No. 764,578, Feb. 1, 1977, abandoned.

[51] Int. Cl.² .............................................. F24H 1/00
[52] U.S. Cl. ................................... 237/1 A; 126/361; 219/279; 219/326
[58] Field of Search ....... 237/1 A; 165/169, DIG. 12; 126/271, 361; 219/279, 326

[56] References Cited

U.S. PATENT DOCUMENTS

| | | | |
|---|---|---|---|
| 2,087,363 | 7/1937 | Tay | 165/169 X |
| 4,037,785 | 7/1977 | Madern | 219/279 X |

OTHER PUBLICATIONS

Heating & Air Conditioning, Mar. 1976, p. 87.
Baseline Solar Collector, Glass Division/PPG Technical Services-Feb. 7, 1976.

*Primary Examiner*—William E. Wayner
*Attorney, Agent, or Firm*—Young & Thompson

[57] ABSTRACT

A method and an arrangement for saving energy in preparing hot water for household, in that warm waste water from bathtub and shower, etc. in the same household is used for preheating by means of a heat exchanger of water from the water distribution system to the water heater in the household.

3 Claims, 5 Drawing Figures

METHOD AND ARRANGEMENT FOR SAVING ENERGY IN PREPARING HOT WATER FOR HOUSEHOLD

This is a division of application Ser. No. 764,578, filed Feb. 1, 1977, now abandoned.

The invention relates to a method and an arrangement for saving energy in preparing hot water for household, by which the water is heated by means of at least one heating source, for example an electric heating element, an oil burner, a gas burner, or a combination of two of these, in a heat insulated container.

The object of the invention is to save energy in that the water in the container is preheated by other heating sources as those mentioned above, the energy of which usually goes lost for such use.

This is according to the invention obtained in that the water in the container by heat exchange also is heated by warm waste water from bathtub and shower etc, in the same household.

Arrangement for saving energy according to the invention will be better understood from the following description of embodiments with reference to the drawings.

Figure 1:
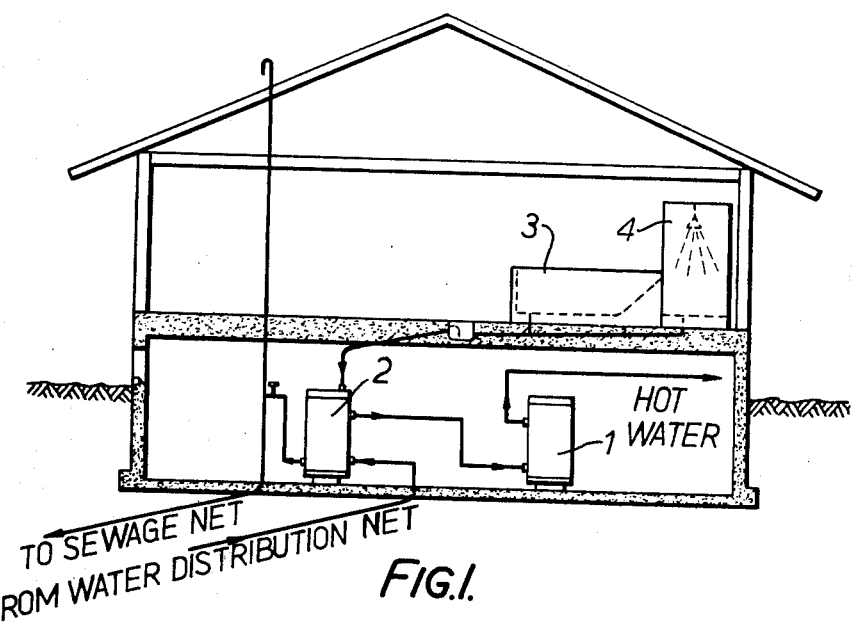
FIG. 1 shows diagrammatically a first embodiment of an arrangement according to the invention.

The arrangement of FIG. 1 has an usual water heater 1 for hot water to a household and the water supplied to the heater 1 is preheated in a heat exchanger 2 through which is circulated warm waste water from at least one bathtub 3 and one shower 4 in the household.

Figure 2:
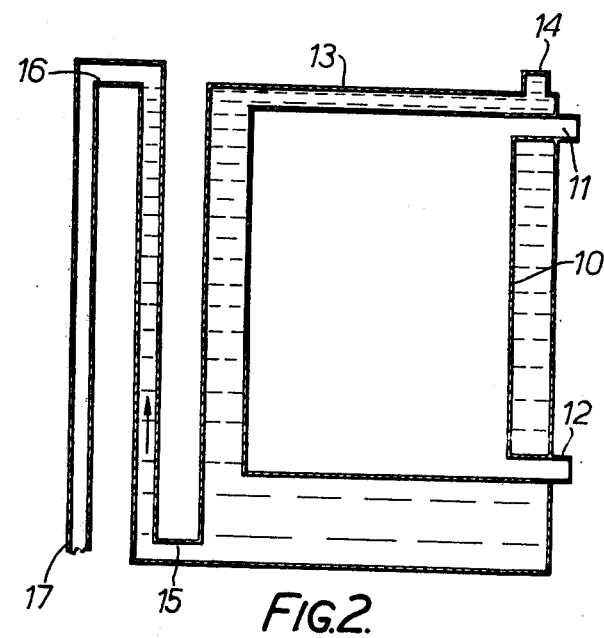
FIG. 2 shows diagrammatically the heat exchanger in the embodiment in FIG. 1.

As shown in FIG. 2 the heat exchanger (2 in FIG. 1) has an inner compartment 10 with a cold water inlet 12 in the lower part for water from the water distribution system, and an outlet 11 for preheated water in the upper part of the compartment 10. The compartment 10 is surrounded by an outer heat insulated compartment 13 with an inlet 14 in the upper part for supply of warm waste water from the bathtub and shower (3 and 4 in FIG. 1), and an outlet 15 in the lower part, which outlet is connected to water trap 16 the outlet 17 of which has same level as the inlet 14, and which through a tube is connected to the sewage net. The warm waste water from the bathtub and shower will remain in the outer compartment and give off heat for the longest possible period.

Figure 3:
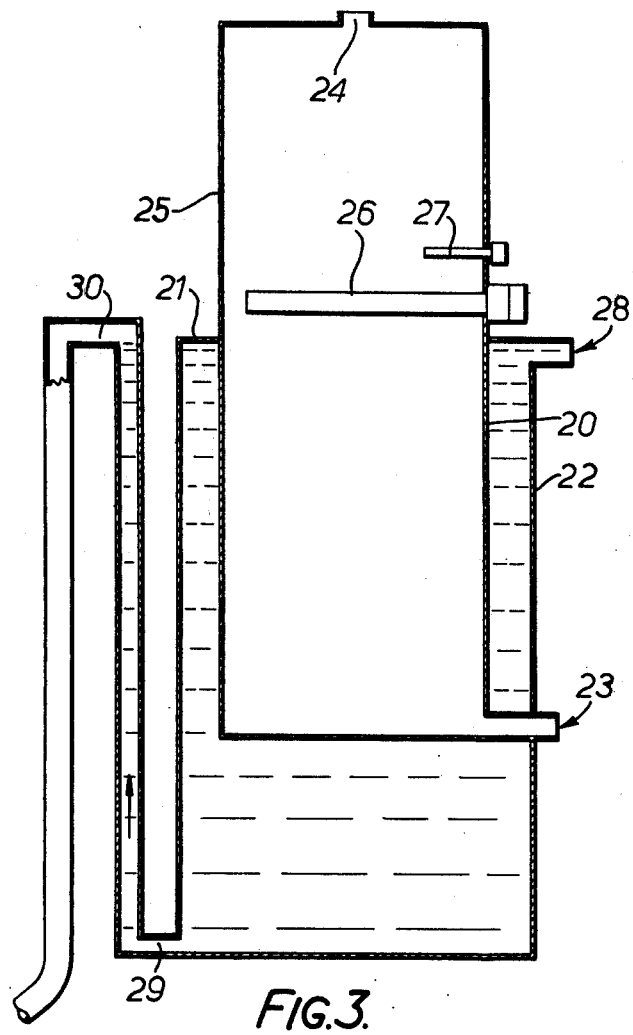
FIG. 3 shows diagrammatically a second embodiment according to the invention in which the container and the heat exchanger is combined.

In FIG. 3 the water heater (1 in FIG. 1) and the heat exchanger (2 in FIG. 1) are combined in that the inner compartment 20 (10 in FIG. 2) is extended out of the top 21 of the outer heat insulated compartment 22 so that cold water from the water distribution system is fed to an inlet 23 in the lower part of the inner compartment 20 and hot water for the household is taken from an outlet 24 at the top of the inner compartment, and the extension 25 of the inner compartment 20 above the outer compartment 22 is heat insulated. In the extension 25 an electric heating element 26 and a thermostat 27 for the control of the heating element 26 are arranged. As explained under reference to FIG. 2, the outer compartment 22 has in the upper part an inlet 28 for warm waste water from bathtub and shower and in the lower part an outlet 29 which is connected to a water trap 30.

Figure 4:
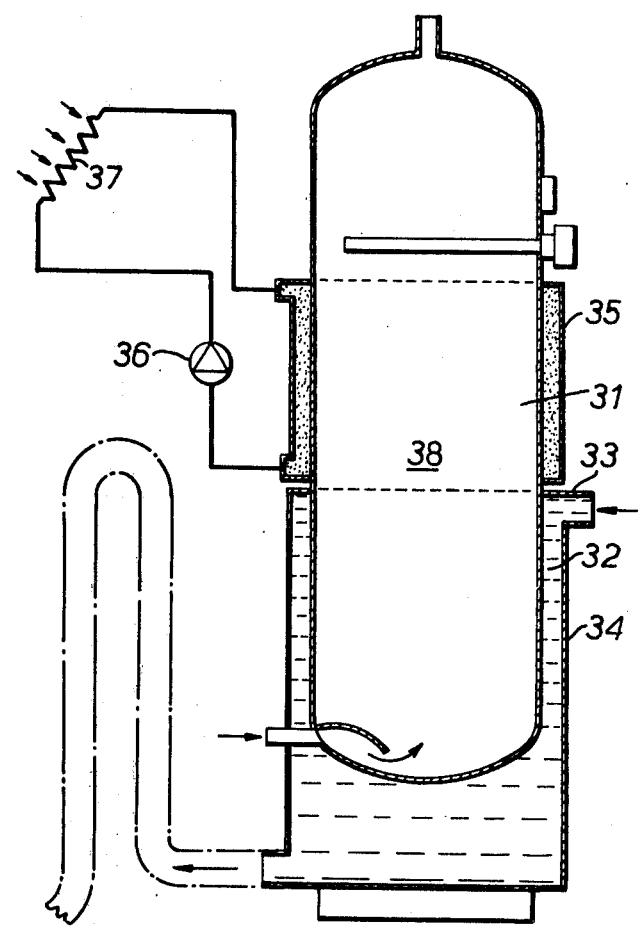
FIG. 4 shows diagrammatically a third embodiment according to the invention in which the container is combined with two heat exchangers.

The embodiment in FIG. 4 differs from the embodiment in that the middle part 31 of the inner compartment 32 (20 in FIG. 3) which also extends above the topp 33 of the heat insulated outer compartment 34, is surrounded by a heat insulated mantle 35 through which by means of a circulation pump 36, is circulated a heat transfer medium which is at 37 exposed to radiation from the sun. The mantle 35 serves as a heat exchanger for solar energy to the water 38 to be heated for domestic use in the household in addition to the energy saved from the warm waste water from bathtub and shower, etc.

If the heat transfer medium is water the circulation of this by means of the circulation pump 36 may be in direct communication with the water 38 to be heated and used in the household.

Figure 5:
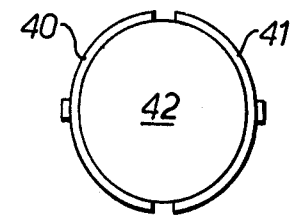
FIG. 5 shows diagrammatically a modification of the heat exchangers in FIG. 4.

FIG. 5 shows a modification of the embodiment in FIG. 4, as the heat exchanger 40 and 41 for warm waste water and solar energy respectively are formed as exteriorly insulated half cylindric compartments 40, 41 which surround the lower part of the inner compartment 42.

Having described my invention, I claim:

1. An arrangement for saving energy in preparing hot water for households, comprising a heat insulated container with a thermostatically controlled electric heating element, which container is supplied with the water to be heated, characterized in that the lower part of the container is surrounded by an exteriorly heat insulated mantle with an inlet at the top of the mantle, for warm waste water from bathtub and shower, etc. and an outlet for the warm waste water at the bottom of the mantle, which outlet is connected to a water trap at the outlet of which being at the level of the said inlet.

2. An arrangement for saving energy in preparing hot water for households, comprising a heat insulated container with a thermostatically controlled electric heating element, which container is supplied with the water to be heated, characterized in that the lower part of the container is surrounded by two exteriorly heat insulated mantles, one above the other, the lower one having an inlet at the top of the mantle for warm waste water from bathtub and shower, etc., and an outlet for the warm waste water at the bottom of the mantle, which outlet is connected to a water trap the outlet of which being at the level of the said inlet, and in the upper mantle is by means of a circulation pump circulated by a heat transfer medium which is exposed to radiation from the sun.

3. An arrangement for saving energy in preparing hot water for households, comprising a heat insulated container with a thermostatically controlled electric heating element which container is supplied with the water to be heated, characterized in that the lower part of the container is surrounded by two exteriorly heat insulated half cylindric adjacent mantles, of which the one has an inlet at the top of warm waste water from bathtub and shower, etc., and an outlet for the warm waste water at the bottom of the mantle, which outlet is connected to a water trap, the outlet of which being at the level of the said inlet, and the other mantle is by means of a circulation pump circulated by a heat transfer medium which is exposed to radiation from the sun.

* * * * *